United States Patent [19]

Adrian et al.

[11] Patent Number: 4,988,191

[45] Date of Patent: Jan. 29, 1991

[54] ELECTRO-OPTICAL METHOD AND SYSTEM FOR DETERMINING THE DIRECTION OF MOTION IN DOUBLE-EXPOSURE VELOCIMETRY BY SHIFTING AN OPTICAL IMAGE FIELD

[75] Inventors: Ronald J. Adrian, Champaign; Christopher C. Landreth, Urbana, both of Ill.

[73] Assignee: University of Illinois, Urbana, Ill.

[21] Appl. No.: 322,114

[22] Filed: Mar. 13, 1989

Related U.S. Application Data

[63] Continuation-in-part of Ser. No. 23,773, Mar. 9, 1987, Pat. No. 4,866,639.

[51] Int. Cl.$^5$ ............................ G01P 3/36; G01P 5/22
[52] U.S. Cl. .................................... 356/28; 73/861.06
[58] Field of Search ............................... 356/28, 28.5; 73/861.05, 561.06

[56] References Cited

U.S. PATENT DOCUMENTS

| | | | |
|---|---|---|---|
| 4,733,962 | 3/1988 | Brendemuehl | 356/28 |
| 4,851,697 | 7/1989 | Schodl | 356/28 X |

*Primary Examiner*—Thomas H. Tarcza
*Assistant Examiner*—Linda J. Wallace
*Attorney, Agent, or Firm*—John F. Ohlandt

[57] ABSTRACT

A system of double-pulse particle velocimetry, according to which small scattering particles are illuminated by two short pulses of laser light and then images are recorded photographically to produce a record from which the particle velocity can be determined by measuring the displacement of the particle images. Particle images is understood to mean both the non-overlapping individual particles and overlapping, coherently interfering images commonly referred to as "speckle". In order to resolve the directional ambiguity inherent in the system, artificial shifting is effected in the image field between exposures by an amount that is greater than any negative displacement occurring in the field, such shifting being performed here by means of an electro-optical device in place of the shifting previously produced by rotating mirrors and the like.

8 Claims, 4 Drawing Sheets

ELECTRO-OPTICAL METHOD AND SYSTEM FOR DETERMINING THE DIRECTION OF MOTION IN DOUBLE-EXPOSURE VELOCIMETRY BY SHIFTING AN OPTICAL IMAGE FIELD

BACKGROUND OF THE INVENTION

The present invention is an improvement on that previously described in co-pending application Ser. No. 023,773, now U.S. Pat. No. 4,866,639, filed Mar. 9, 1987, of which the present application is a continuation-in-part. The benefit of the filing date of that co-pending application with respect to common subject matter is herewith claimed.

The invention herein resulted from work which is supported by TSI Inc. and the National Science Foundation under NSF ATM 86-00509.

The present invention pertains to the measurement of the velocity of fluid flows and, more particularly, to systems in which the fluid flow rate is inferred from measurements made in the context of double-pulsed particle image velocimetry, in which small scattering particles are illuminated by two short pulses of laser light or other light, and their images are recorded photographically to produce a record from which the particle velocity can be determined by measuring the displacement of the particle images.

For specific background material, reference may be made to U.S. Pat. No. 4,729,109, assigned to the assignee of the present invention; also to co-pending application Ser. No. 023,773, also assigned to the assignee of the present invention.

As will be appreciated by the references cited above, particle image velocimetry (PIV) is a well-established technique in experimental photo-mechanics for quantitatively measuring velocity data at a given instant of time over an extended flow field. A variety of other references which were cited in co-pending application Ser. No. 023,773 may be consulted for the details of the technique involved.

Generally speaking in the PIV technique the flow is seeded with small particles, typically ten micrometers or less in size, and illuminated by a thin sheet of pulsed laser light, typically coded with a double pulse. Particles moving within the light sheet are recorded photographically as pairs of particle images. The local fluid velocity is found on a grid of small "interrogation spots" on the photograph by sequentially measuring the displacement $\Delta x$ of the images within each spot. Interrogation is accomplished by a variety of methods including the Young's fringe method, direct measurement of image-to-image displacement, and spatial correlation analysis. By successively analyzing the photograph at many adjacent interrogation regions, local velocity may be inferred in a large number of points in the flow field.

Given identical conditions in viewing each of the two exposures on a double-pulsed PIV photograph, there exist no characteristics on the photograph to distinguish first images from second images. As a result, measurement of the particle image separation cannot determine the polarity of the fluid velocity and the velocity vector is ambiguous in sign: $\pm \mu$. Clearly, it is necessary to determine the order of the two exposures on the photograph to eliminate directional ambiguity.

In accordance with the invention described in co-pending application Ser. No. 023,773, a technique known as "image shifting" has been shown to be effective in resolving directional ambiguity. This method displaces the photographic image field by an appropriate uniform, known distance between the first and second pulses. As a result, the second image of each particle image pair is shifted by a displacement $X_s$ such that the most negative fluid velocity still produces a positive displacement of the second particle image with respect to the first. After the interrogation, the artificial shift $X_s$ is subtracted mathematically to obtain the actual fluid velocity.

Several methods have been implemented to produce the image shifting during the recording procedure in particle image velocimetry. Image shifting has been accomplished by placing a rotating mirror in front of the photographic lens, and by translating the camera apparatus between exposures. Other methods have also been proposed, including moving the film within the camera and translating the camera lens with a piezoelectric device. The drawback with each of the above-noted methods is the mechanical motion involved in part of the recording apparatus between the first and second light pulses. Consequently, they are subject to limitations on speed due to the dynamics of moving components, and limitations on accuracy and consistency.

Accordingly, it is a primary object of the present invention to overcome the limitations on operations at high and low speeds in connection with image shifting in pulsed velocimetry systems, and to carry out the operations with a high degree of accuracy.

Another object is to permit image shifting in periods of time less than one microsecond.

A further object is to provide precise reproducible shifts without the need for moving parts to accomplish them.

SUMMARY OF THE INVENTION

The above and other objects are fulfilled in accordance with the present invention by a primary feature involving an electro-optical image shifting arrangement including a birefringent, uniaxial crystal plate; and a camera lens interposed between said crystal plate and the image plane, the crystal plate being cut with its "surface normal" aligned at an oblique angle $\theta_a$ to the crystal's optical axis, such that a given light ray from any source in the object plane is refracted into two parallel light rays having mutually orthogonal states of linear polarization. Accordingly, for a given scattering particle in the object plane, two images of the particle are formed at the film plane of the camera, separated by $X_s$, which is the amount of image shifting introduced by the present invention. However, it will be understood that when the moving particle or the image thereof is recorded by means of two illuminating pulses, four images are thereby formed.

In accordance with a more specific feature of the present invention, means are provided for controlling the polarization of the light scattered from the seeding particles so that the first illuminating pulse from the source scatters light which is linearly polarized and parallel to the principal plane of the birefringent crystal, and the second pulse scatters light which is linearly polarized at 90 degrees with respect to the light from the first pulse, whereby only two particle images will be formed for a single moving particle.

Other and further objects, advantages and features of the present invention will be understood by reference to

BRIEF DESCRIPTION OF DRAWING

FIG. 4A shows principal image shift vs. the tangent of the principal angular derivation from the photographic axis; FIG. 4B is the same as FIG. 4A but reduced scale; FIG. 4C shows transverse image shift vs. the tangent to the transverse angular deviation from the photographic axis. $X_{so}$ is the on-axis image shift, and $s_i$ is the image distance.

FIG. 5A shows stationary reference frame. FIG. 5B shows reference frame moving at the uniform translation velocity.

DESCRIPTION OF PREFERRED EMBODIMENT

Figure 1:
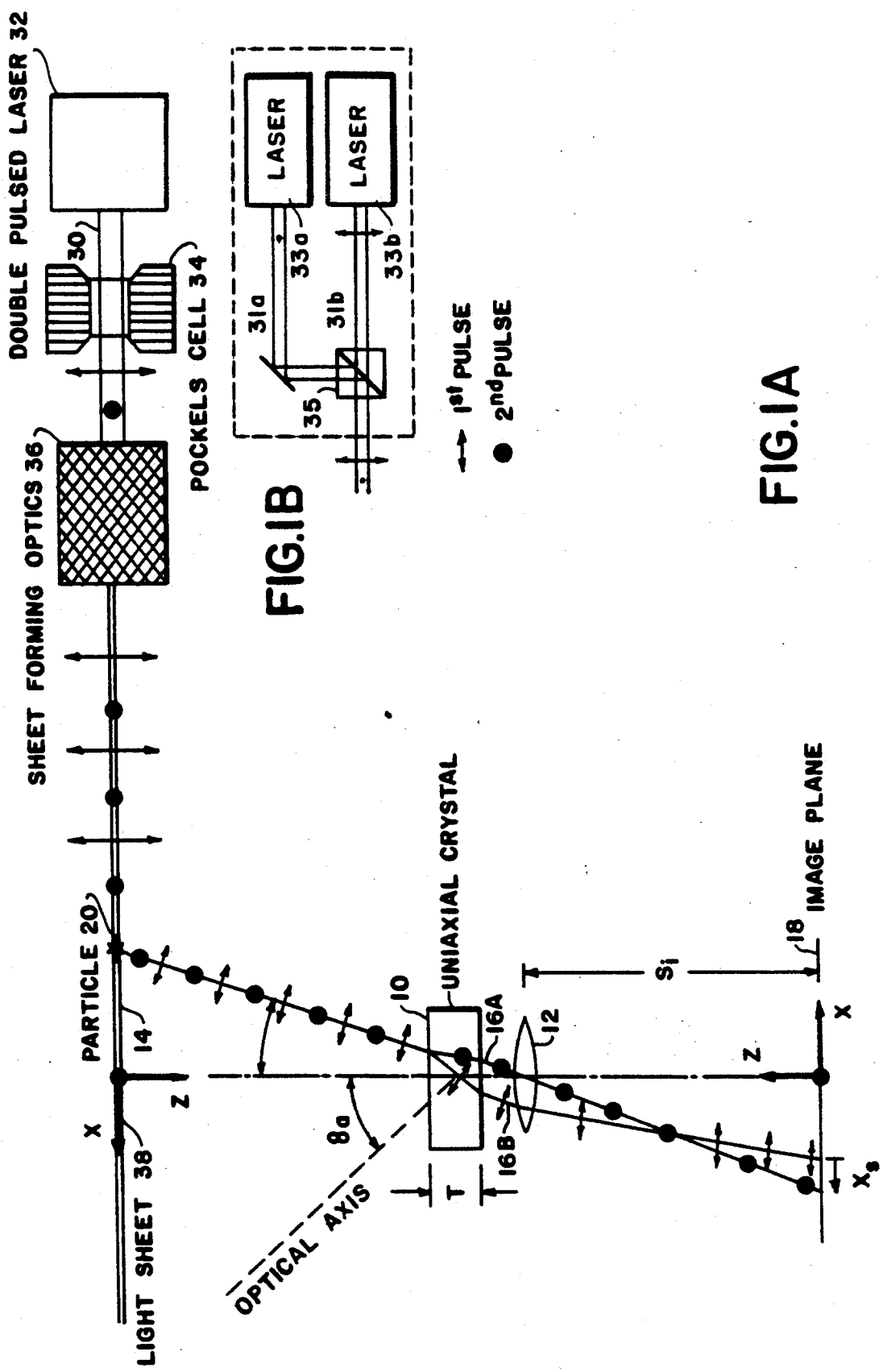
FIGS. 1A and 1B are schematic diagrams of the electro-optical image shifting system of the present invention.

Referring now to the figures of the drawing and, in particular, FIG. 1, there is illustrated in this figure an embodiment of the electro-optical image shifting system of the present invention. As will be seen therein, a birefringent, uniaxial crystal plate 10 (for example, calcite) is positioned in front of a camera lens 12. The plate is cut with its "surface normal" aligned parallel to the crystal's principal plane and at an oblique angle $\theta_a$ to the crystal's optical axis, such that a given light ray from any source in the object plane 14 is refracted into two parallel light rays 16A and 16B, commonly referred to as an o-ray and an e-ray, having mutually orthogonal states of linear polarization. Consequently, the separation of the two rays is nearly uniform for a wide range of incident angles and scaled to the desired image shift $\underline{X}_s$ seen on the image plane 18 for the chosen camera magnification.

For a given scattering particle 20 in the object plane 14 within the flow field, two images of that particle are formed at the film or image plane 18 of the camera, separated by $\underline{X}_s$. The intensities of the two images are equal to the intensities of the two orthogonal components of polarization, with respect to the crystal's principal plane, of the light incident on the plate 10. Accordingly, when a moving particle is recorded with two illuminating pulses, four images are formed, arranged in a parallelogram having two sides equal in length to the image displacement $|\underline{\Delta x}|$ and two sides equal to $\lfloor \underline{X}_s \rfloor$.

The polarization of the light scattered from the seeding particles is controlled so that the first illuminating pulse scatters light which is linearly polarized and parallel to the principal plane of the birefringent crystal plate 10, and the second pulse scatters light which is linearly polarized at 90 degrees with respect to the light from the first pulse. As a consequence, only two particle images will be formed for a single particle, displaced by the vector sum of x and $x_s$. This is the desired result for any image shifting technique.

In the system shown in FIG. 1, the polarization of the scattered light is controlled by switching the polarization of the laser beam 30 at the exit of the cavity of double-pulsed laser 32. A Pockels cell 34, well-known, per se, such as one manufactured by Quantum Technology, Sandford, Fla., is used with the double-pulsed laser 32 to switch the linear polarization, between pulses, from a vertical state to a horizontal state (or vice versa). The output of Pockels cell 34 is transmitted to sheet forming optics means 36, also well-known, per se, as described in the article "Pulsed Laser Velocimetry for Measurement of Fluid Flow," R. J. Adrian and C. S. Yao in Proceedings, Eighth Biennial Symposium on Turbulence, G. Patterson and J. L. Zakin, Eds. (University of Missouri, Rolla, 1983). As a result, the light sheet 38 is produced.

An alternate system to that of FIG. 1 incorporates the output from two orthogonally-polarized single-pulsed lasers 33A and 33B, fired in sequence, which are combined using a polarizing beam-splitting cube 35. In this case, the light is sent to the sheet forming optics 36 in two beams 31A and 31B.

Figure 2:
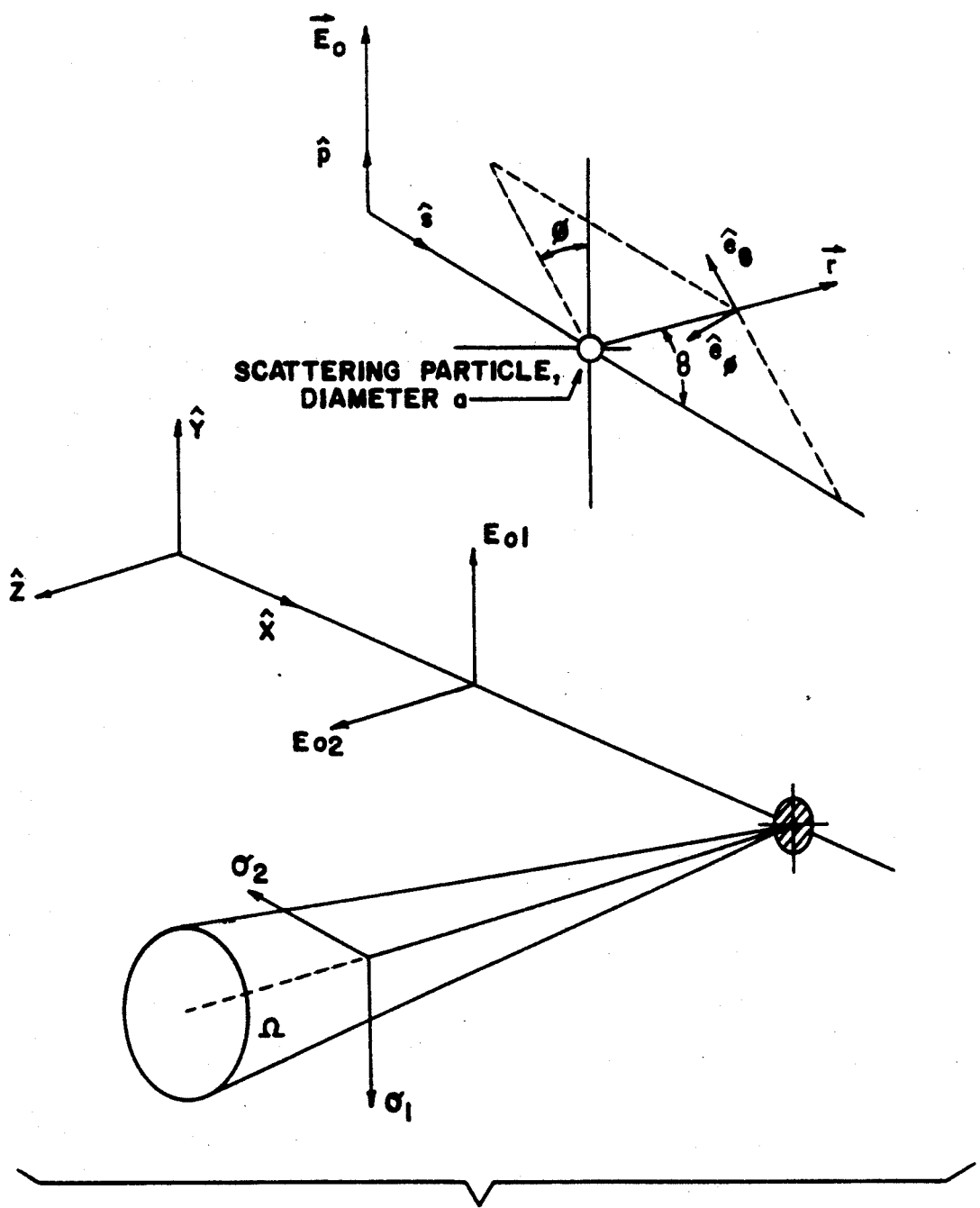
FIG. 2 illustrates the polarization of linearly-polarized light at 90 degrees by a spherical particle.

In the system of FIG. 1, the extinction by the uniaxial plate 10 of the shifted image of the first exposure and the unshifted image of the second exposure depends upon creating linear, orthogonal states of polarization over the solid angle $\Omega$ defined by the photographic aperture. In general, for spherical particles, the polarization of the scattered wave is given by the Mie scattering coefficient $$\underline{\sigma}(\underline{r}) = A(\theta) \sin \phi \hat{e}_\phi + B(\theta) \cos \phi \hat{e}_\theta,$$

where A and B are complex functions of $\theta$ and all other quantities are defined in FIG. 2. When side-scattering occurs over an infinitesimal solid angle perpendicular to the direction of illumination, e.g. centered on the photographic axis z, the polarization of the scattered light wave is linear. If the illuminating beam is polarized vertically ($\underline{E}_{01}$), then the side-scattered light is also vertically polarized: $\sigma_1 = -A(90°)$. If the illuminating wave is polarized horizontally, then the side-scattered wave is also polarized horizontally: $\sigma_2 = -B(90°)$. In the idea limit of infinitesimal solid angle, the first and second exposures of a particle centered in the camera's field of view would be polarized, respectively, in the X and Y directions of the camera coordinates (FIG. 1), as desired.

Practical applications of this approach require orthogonal polarization of the two scattered light waves when the photographic field of view is finite and the solid angle of the lens is finite. The latter effect has been evaluated by calculating the scattering characteristics of typical PIV seeding particles, using Mie scattering theory.

Figure 3A:
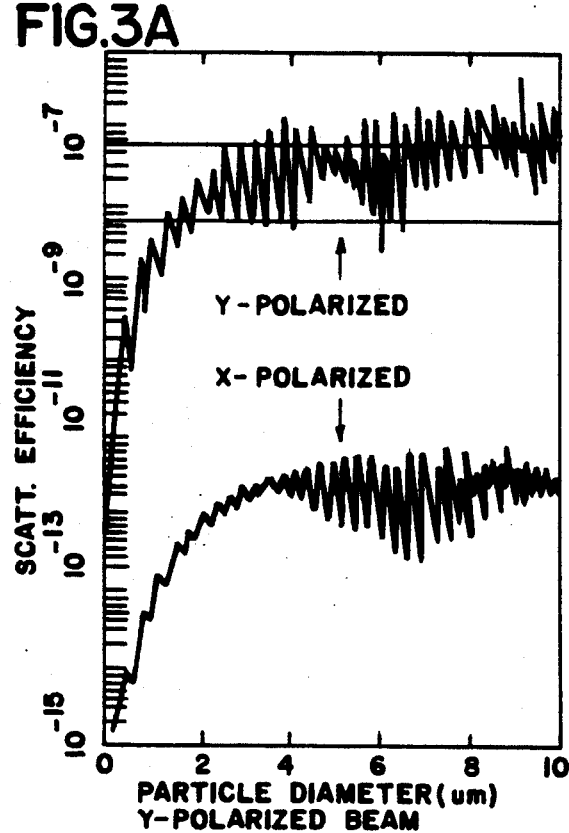
FIGS. 3A and 3B illustrate the light scattering response of plastic particles in water ($n/n_o=1.20$) for linearly-polarized illumination ($\lambda=694.3$ nm), at 90 degrees side-scatter, using a finite light gathering cone. Numerical calculations incorporate Mie scattering theory and assume a lens aperture of f16. The two horizontal bars in each graph bound the approximate range of scattering response suitable for Kodak Technical Pan 2415 film.
Figure 3B:
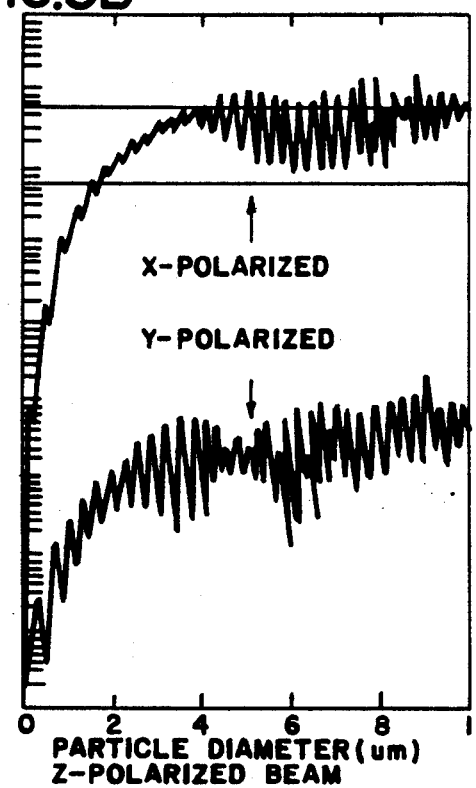

FIG. 3 shows the results of calculations of the scattering efficiency (defined as the ratio of the particle image intensity to the illumination intensity) performed for a polystyrene particle in water, in which the particle diameter is varied up to 10 $\mu$m and a lens aperture of f16 is used. In FIG. 3A, two curves are shown corresponding to the X and Y components of the scattered light, for a -polarized light source. The Y polarization component is over four orders of magnitude larger than the X component for the entire range of particle diameters. In FIG. 3B, the source is switched to -polarization, and the X and Y responses likewise switch. The X-component dominates by over four orders of magnitude. Calculations using a variety of other particle sizes and compositions (including hollow spheres and metallic-coated spheres) show similar tendencies for the scattered light waves to retain linear, orthogonal polarization when the scattering occurs over finite solid angles normal to the illuminating light.

The effect of finite field of view is to include scattering from off-axis particles whose mean scattering angles are not perpendicular to the light sheet (e.g $\theta \neq 90°$). In general, the polarizations at these angles need not be linear or orthogonal. However, experimental examination of the ratio of the horizontally and vertically polarized waves indicates that the extinction ratio is large over a $\pm 20°$ field-of-view for 15 micron polystyrene particles in water and 4 micron silver-coated glass spheres in water. The use of a finite field of view is thus not a limiting factor in these cases.

Figure 4A:
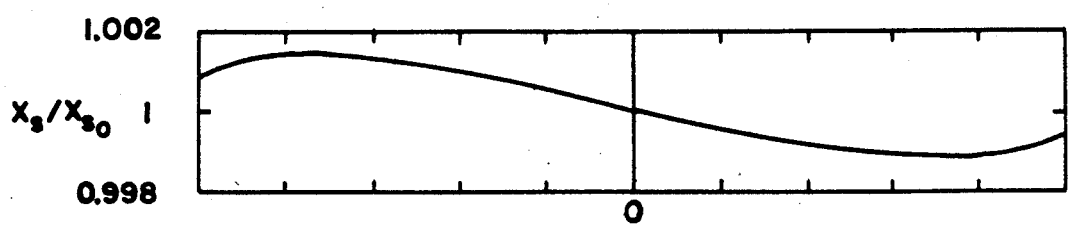
FIGS. 4A, 4B, and 4C illustrate image shift response using a calcite crystal ($n_o=1.65259$, $n_e=1.48382$), having an optic axis angle $\theta_a=53.58$. Open circles indicate observed measurements.
Figure 4B:
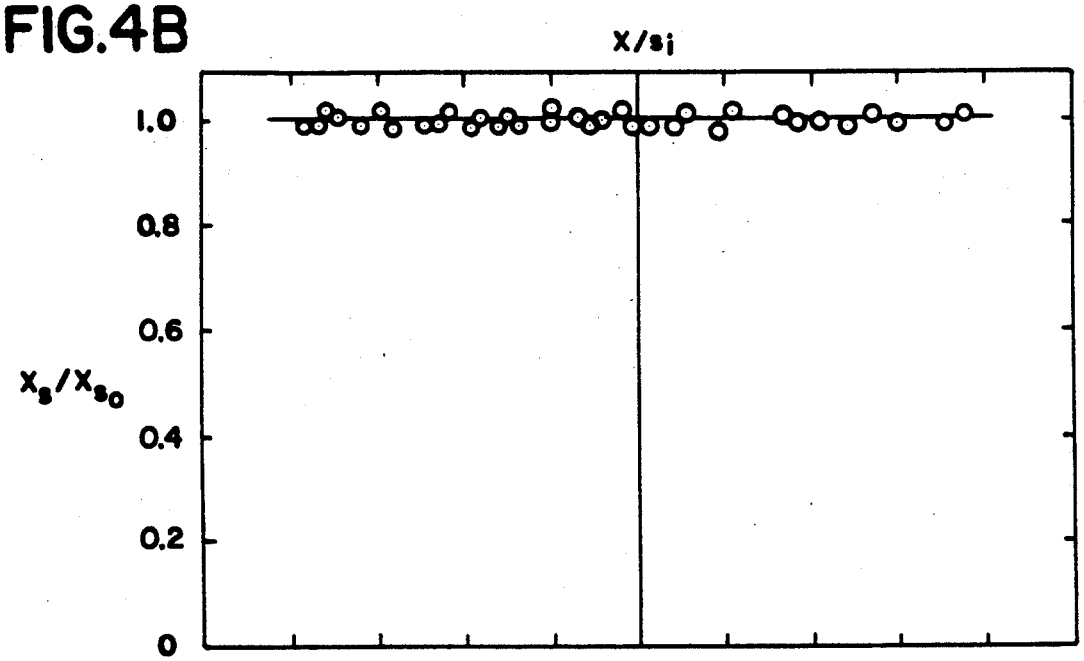
Figure 4C:
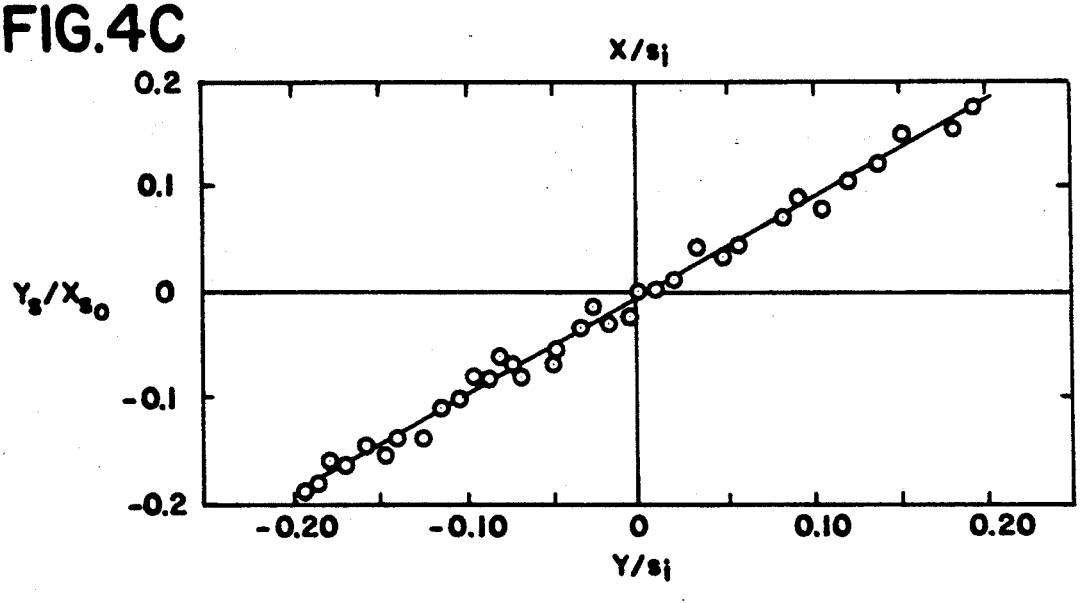

The design of the uniaxial crystal plate 10 (FIG. 1) involves appropriate selection of the angle between the optical axis $\theta_a$ and the normal to the transmitting surfaces, and the plate thickness T. $\theta_a$ is chosen so that the image shift $X_s(X,Y)$ is nearly uniform across the photograph, and T is selected so that the shift is scaled to the desired constant value $X_s$ for the user-chosen camera magnification. The optimal value of $\theta_a$ has been determined computationally by modeling the propagation of light through uniaxial calcite material using Huygens's wavefront construction in three dimensions. A value $\theta_a = 53.58$ degrees results in a shift magnitude $X_s$ along the principal plane of the crystal which is very uniform. The calculations in FIG. 4A indicate a maximum variation of the shift in the X-direction that is less than 0.15 per cent. The computations indicate the presence of a non-negligible transverse component $Y_s(X,Y)$, perpendicular to the principal plane, which is shown in FIG. 4C. The image shift vector $X_s$ is thus somewhat non-uniform, but the non-uniformity is known a priori and thus may be corrected computationally during the interrogation procedure.

EXPERIMENTAL RESULTS

An electro-optical image shifting system using the Pockels cell system of FIG. 1 has been constructed. The response time of the Pockels cell is approximately 10 ns, which is comparable to the pulse width of the double pulsed lasers used for PIV, and therefore capable of image shifting the fastest flow fields that are currently contemplated. Currently there are three calcite plates in use having thicknesses of 2 mm, 6 mm, and 10 mm, which may be mounted separately or combined in front of the camera lens to provide image shifts magnitudes of $0.2 \text{ mm} < X_s < 1.8 \text{ mm}$.

Two experiments were performed to evaluate the image-shifting technique. In the first, the accuracy of image-shifted measurements was evaluated across a PIV photograph. For this experiment, single-pulse illumination was used to record a stationary flow field illuminated by a circularly polarized beam. The Pockels cell was not activated in this experiment. As a result, the PIV photographic field contained two images of each particle, separated by the local value of $X_s$ for that image pair. Over three hundred particle image displacements were measured across the photograph. A selection of these measurements, collapsed along and $X$- and $Y$-directions, are plotted in FIGS. 4B and 4C. The measurements agree well with the numerical predictions. The RMS error of the measurements is approximately 0.8% full-scale, most of which may be attributed to the accuracy limitations of the PIV interrogation system used to extract information from the photograph.

Figure 5A:
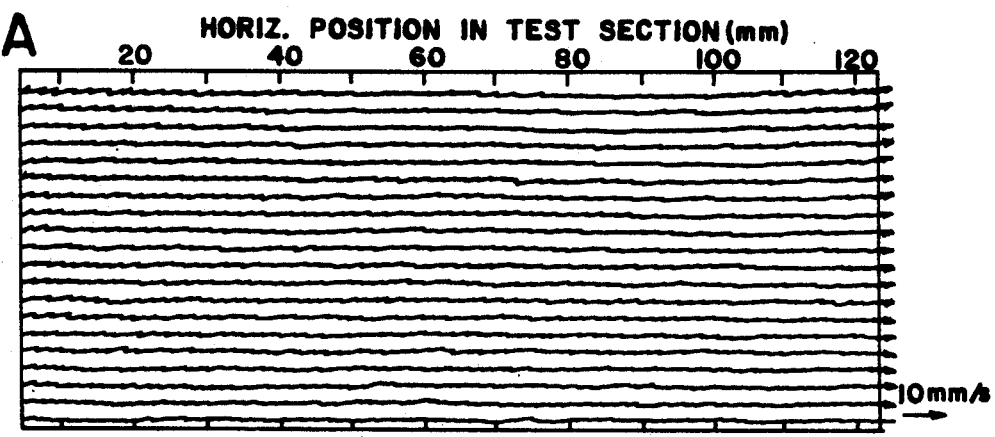
FIGS. 5A and 5B illustrate PIV velocity vector maps of a uniformly-displaced water flow field having a small transient flow velocity, using electro-optical image shifting.
Figure 5B:
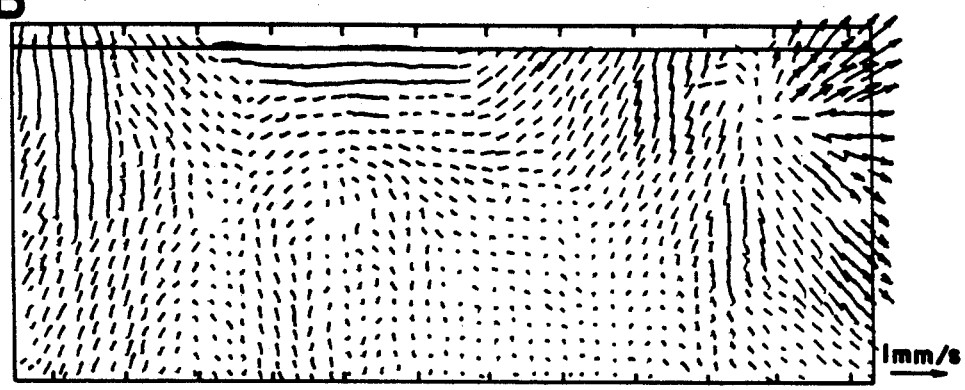

In the second experiment, the entire image shifting system was evaluated using PIV photos of nearly-quiescent water contained in a test section which was horizontally displaced with a uniform velocity $\bar{U}$. A small transient velocity $u_t(x,y,z)$ was present in the flow during the uniform translation, where $|u_t|_{max} < 0.15 \bar{U}$. The calcite plate was oriented to provide a vertical image shift. The photographs were taken over an extended field of view ($\pm 15°$) using a finite camera aperture (f8). Each interrogation of a PIV photograph of the flow generally produced a highly detachable measurement of the particle image displacement, consisting of the vector sum of the image shift $X_s(X,Y)$, the displacement $M\Delta t\bar{U}$, and a small component which is attributed to the transient displacement $M\Delta tu$ (M is the magnification of the camera). The vector map of the interrogated PIV photograph (FIG. 5A) shows a highly resolved velocity field $\bar{U}+u_t(x,y)$. When the translation velocity $\bar{U}$ is subtracted from the vector field, the resulting map (FIG. 5B) clearly reveals the transient structure.

SUMMARY AND CONCLUSIONS

In summary, image shifting based on electro-optical hardware is an effective approach in PIV that offers several advantages over mechanical shifting techniques. Two systems for implementing this approach, one incorporating a Pockels cell to modulate the output from a single laser and the other incorporating the output from two orthogonally polarized lasers have been described. The use of a properly designed calcite element results in an image shift which is nearly uniform over a wide light-gathering cone. The method is accurate, reliable and fast enough to accommodate the highest fluid velocities likely to be studied with particle image velocimetry, and it is equally applicable to laser speckle velocimetry.

It is understood that the effectiveness of either of the two systems described above depends upon retaining light polarization after sidescatter. Consequently they may be limited to certain ranges of particle types, particle sizes, angular fields of view and camera apertures. Further investigation is required to determine these limitations. An alternative electro-optical system, which incorporates a wide-angle Pockels cell in front of the uniaxial plate for directly modulating the particle-scattered light, is anticipated to expand the effectiveness of electro-optical image shifting, and is currently being investigated.

While there has been shown and described what is considered at Present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

We claim:

1. In a particle image velocimetry system in which respective image fields are created by accurately timed exposures involving first and second light pulses from a light source; and successive particle images, formed from light rays scattered from the particles, and resulting from seeding particles being displaced by the motion of a fluid, are recorded, such that the field velocity is inferred from the physical displacement of the respective image fields between the exposures, the improvement which comprises:

an arrangement for determining unambiguously the direction of displacement, and hence the sign of the velocity vector, said arrangement including a camera having a lens and an image plane, said camera being positioned to receive scattered light; and further including electro-optical means for artificially shifting the successive particle images a predetermined amount between exposures so that at least one vector component of all image displacements is positive even though corresponding components of physical displacements of the seeding particles may be negative;

said electro-optical means for artificially shifting comprising means providing that light scattered by the particles toward the camera from the second light pulse is linearly polarized 90 degrees with respect to light scattered toward the camera from the first light pulse, and means for displacing the rays of the light scattered toward the camera according to the polarization so that the image field of the second exposure is shifted with respect to the image field of the second exposure is shifted with respect to the image field of the first exposure;

said camera lens being interposed between said means for shifting and the image plane.

2. The system as defined in claim 1, in which said means for displacing the light rays is a crystal plate, having a principal plane, an optical axis, and an optical plane, the crystal plate being cut with its surface normal aligned parallel to the principal plane and at an oblique angle A to the optical axis, such that a given light ray in the optical plane is refracted into two parallel light rays having mutually orthogonal states of linear polarization.

3. The system as defined in claim 2, the improvement further comprising means for controlling the polarization of the light scattered from the seeding particles so that the first light pulse scatters light which is linearly polarized and parallel to the principal plane of said crystal plate, and the second light pulse scatters light which is linearly polarized at 90 degrees with respect to light from the first pulse, whereby only two particle images are formed for a single particle, said images being displaced by the vector sum of X and $X_S$, where X is the displacement between successive images and $X_S$ is the image shift.

4. The system as defined in claim 3, in which said means for controlling polarization of the scattered light includes means for switching the polarization of said scattered light.

5. The system as defined in claim 4, in which said light source is a double pulsed laser, and said means for switching comprises a Pockels cell for switching the linear polarization of the pulses from a vertical to a horizontal state or vice versa.

6. The system as defined in claim 5, in which said double pulsed laser includes a cavity, having an exit and in which said Pockels cell switches the linear polarization of the pulses at the exit of said cavity.

7. The system as defined in claim 4, in which said light source comprises two orthogonally-polarized single-pulsed lasers fired in sequence, and means for combining the outputs from the two lasers, said means comprising a polarizing beam-splitting cube.

8. The system as defined in claim 4, further comprising sheet-forming optics for producing a light sheet.

* * * * *

UNITED STATES PATENT AND TRADEMARK OFFICE
CERTIFICATE OF CORRECTION

PATENT NO. : 4,988,191
DATED : January 29, 1991
INVENTOR(S) : Ronald J. Adrian, Christopher C. Landreth It is certified that error appears in the above-identified patent and that said Letters Patent is hereby corrected as shown below:

Col. 3, line 22, change "optic" to --optical--.
Col. 4, line 38, change this entire line to:
-- $\underline{g}(\hat{\underline{r}}) = A(\theta)\sin\phi \hat{\underline{e}}_\phi + B(\theta)\cos\phi \hat{\underline{e}}_\theta$, --;
line 43, change "illumination ," to --illumination s,--;
line 47, after "(90°)", insert --$\hat{\underline{y}}$--;
line 49, after "(90°)", insert --$\hat{\underline{x}}$--;
line 50, change "idea" to --ideal--.
Col. 5, line 1, before "-polarized", insert --$\hat{\underline{y}}$--;
line 4, before "-polarization", insert --$\hat{\underline{z}}$--;
line 67, change "Xs" to --$\underline{X_s}$--.
Col. 6, line 22, change "MΔt$\overline{U}$" to --MΔt$\overline{\underline{U}}$--;
line 23, change "MΔtu: to --MΔt$\underline{u}$--.
Col. 7, line 4, change "field" to --fluid--;
lines 29-30, delete "image field of the second exposure is shifted with respect to the".

Signed and Sealed this

Thirtieth Day of June, 1992

*Attest:*

DOUGLAS B. COMER

*Attesting Officer*     *Acting Commissioner of Patents and Trademarks*